Nov. 3, 1931.  C. J. LANGLEY  1,829,994
METHOD OF MAKING MATCH BOOKS
Filed Jan. 29, 1929 4 Sheets-Sheet 1
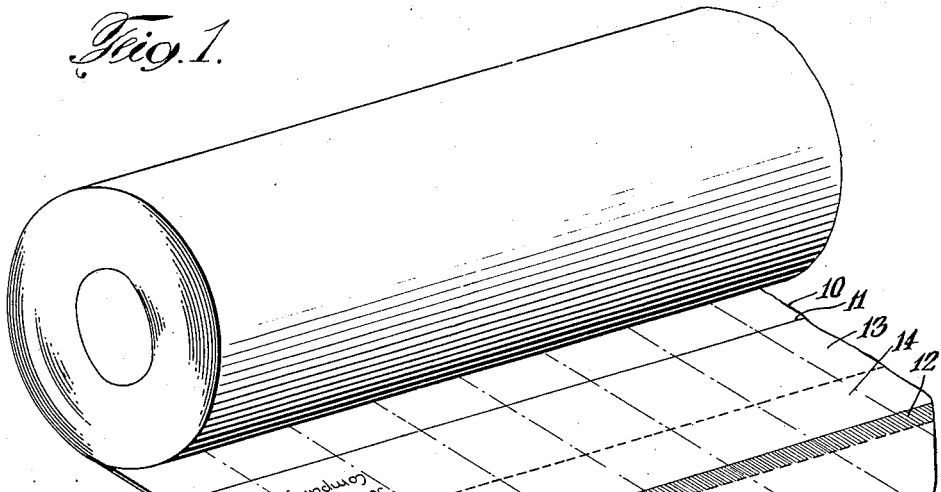
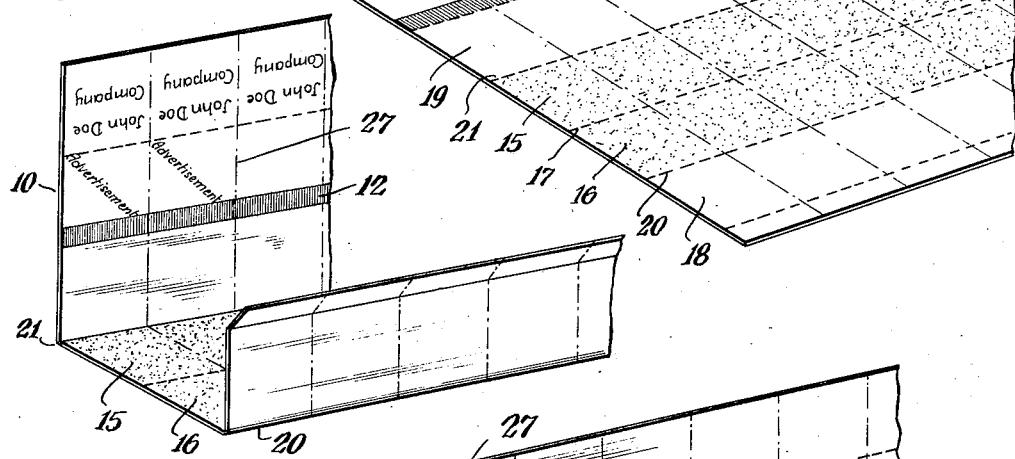
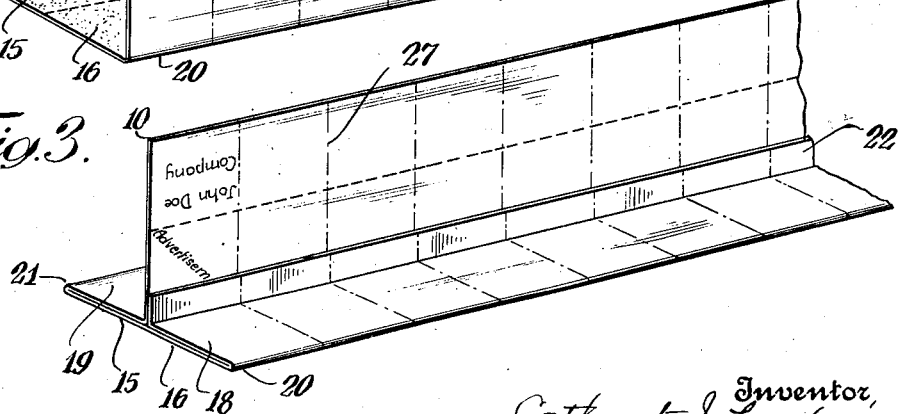
Inventor,
Cortlandt J. Langley.
By his Attorneys.
Hoguet & Neary.

Nov. 3, 1931.  C. J. LANGLEY  1,829,994
METHOD OF MAKING MATCH BOOKS
Filed Jan. 29, 1929  4 Sheets-Sheet 2
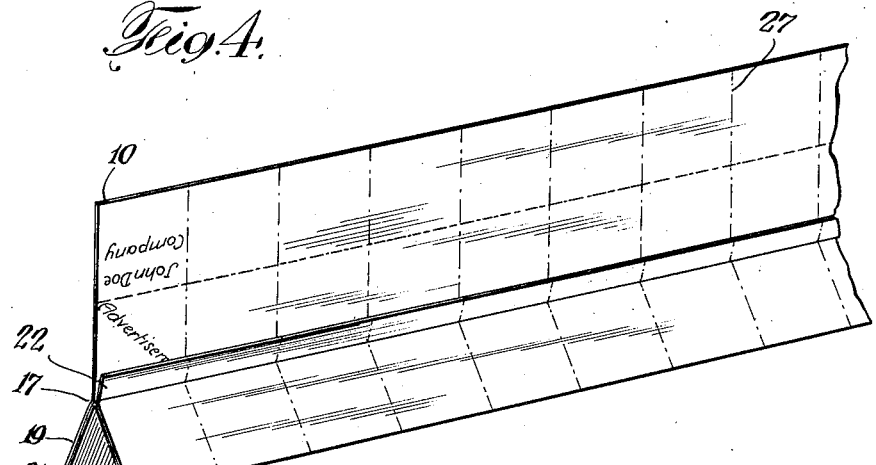
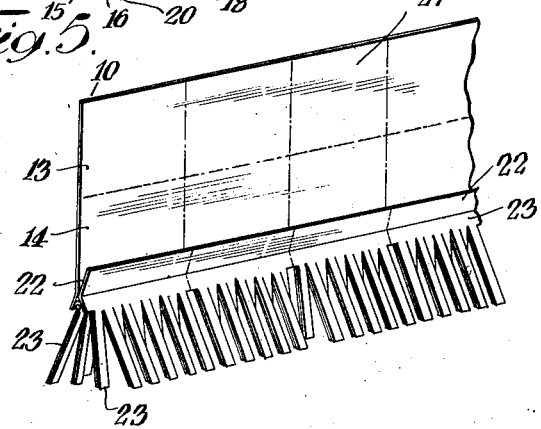
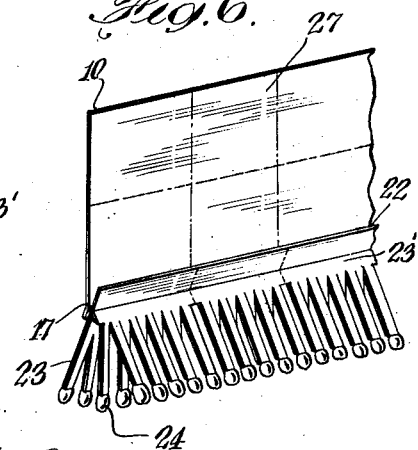
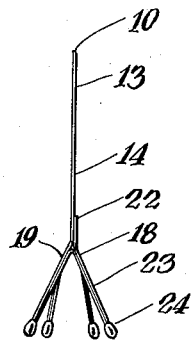
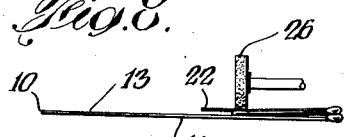
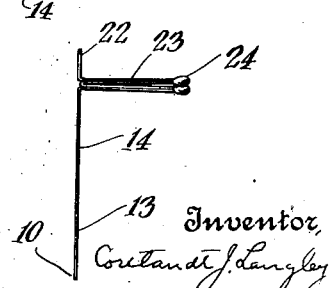

Nov. 3, 1931.  C. J. LANGLEY  1,829,994
METHOD OF MAKING MATCH BOOKS
Filed Jan. 29, 1929  4 Sheets-Sheet 3
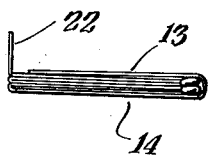
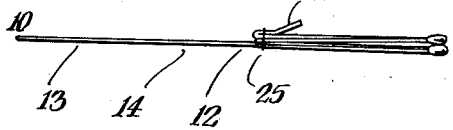
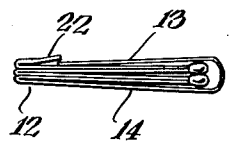
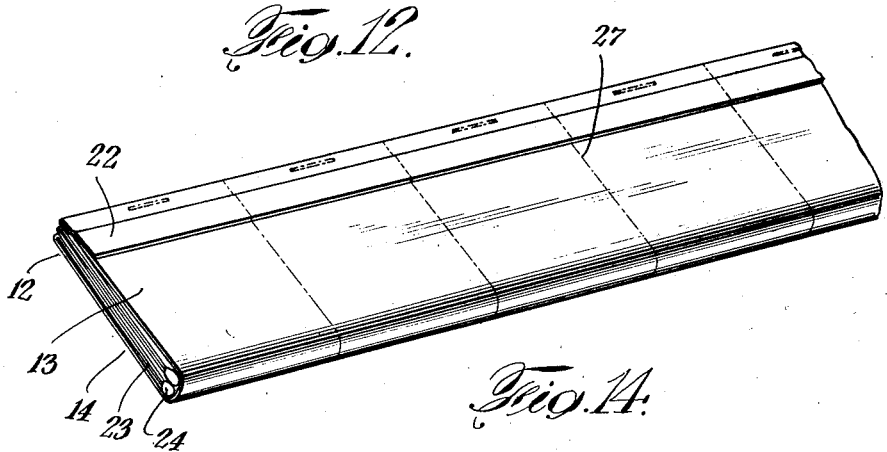
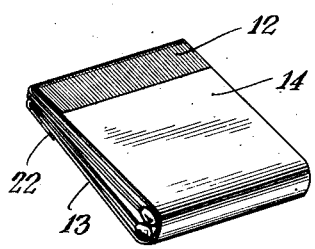
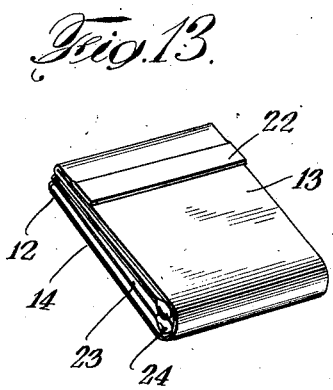

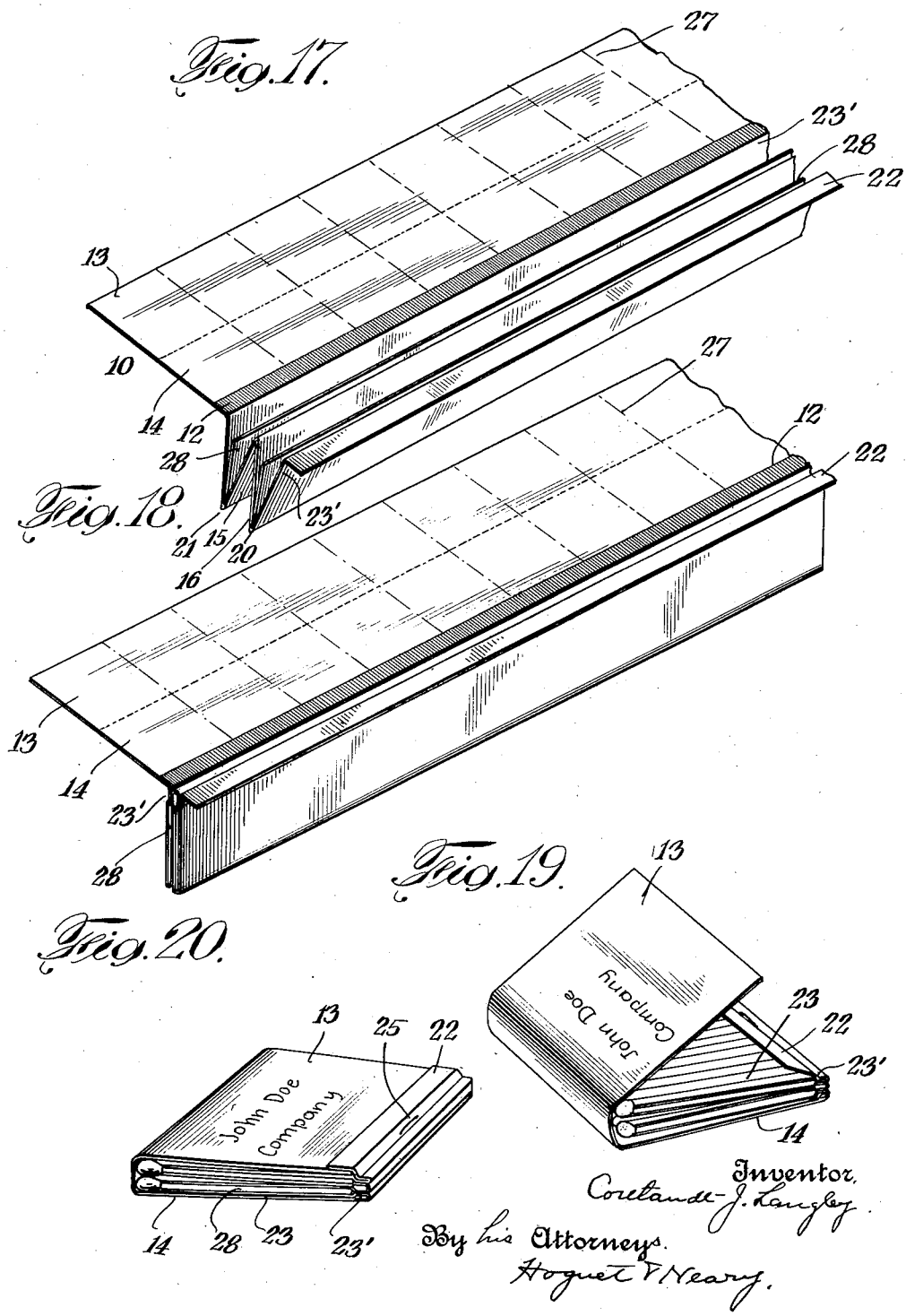

Patented Nov. 3, 1931

1,829,994

UNITED STATES PATENT OFFICE

CORTLANDT J. LANGLEY, OF NEW YORK, N. Y., ASSIGNOR TO CHARLES W. BUMSTEAD, TRUSTEE, OF HIGHLAND PARK, NEW JERSEY

METHOD OF MAKING MATCH BOOKS

Application filed January 29, 1929, Serial No. 335,976.

My invention relates to improvements in the art of making match books and the objects of the invention are generally to make commercial match books faster, cheaper and better than by the methods heretofore employed.

The general practice in making match books is to make the match cards, which comprise the splints and the connecting base either of wood or especially prepared paper which is fastened in various ways, usually by stapling, to an enclosing cover on which advertising matter is displayed and which as noted, is separate from the cards and splints. The match cards, therefore, are usually of more expensive material than the cover parts and, if of wood, they are objectionable because the wood splits off so unevenly, although the burning qualities of the wood are desirable.

In carrying out my invention the cards, including the splints and bases, are made from the same material and in fact, integral with the cover parts, and the material of the cover is folded in such a way that the cards, including the splints, are made from the folded parts, thus making the splints laminated and sufficiently strong. Moreover, by making the cards and splints from folded and rather thin and hard material and fastening the opposed parts together, I get a strong splint having the head end at the doubled over part of the fold so that it is strong and the head adheres well. If desired, a filler of wood or other prepared material can be inserted in the folds from which the match cards are produced to obtain more desirable burning qualities. In this case it is of course apparent that even thinner, and correspondingly cheaper, paper can be used. This does not change the theory of the method but is simply an addition to one step of the method which can be used, if desired, as will appear more clearly in the specification which follows:

While it is important to have the match cards produced in the general way specified, it is also desirable and tends to cheapen and better the structure to have the material of the cards merged into the cover parts of the book so that they are all of one piece. Thus, by proper manipulations a one-piece match book can be made which is better and cheaper than the match book made in the ordinary way. Furthermore, I have found that by the general practice outlined above, a whole series of books can be folded, cut dipped and made as easily as a single book, and after the material has been shaped and prepared, the several books can be separated by cutting through the stock, thus further speeding up and cheapening the process. Furthermore, a strip of many books as long as the width of the widest paper made can be handled. This is important since paper is sold cheaper by the paper manufacturers if the widest width can be used without cutting or rerolling.

Reference is to be had to the accompanying drawings forming a part of this specification, in which similar reference characters indicate corresponding parts.

Figure 1 is a broken perspective view, showing a roll of paper stock in course of preparation for a series of strips for match books.

Figure 2 is a broken perspective of a part of the stock in which the first folding step has been made and the adhesive applied to the parts which are to be united.

Figure 3 is a broken perspective view, showing the next step in which the opposed parts of the folded stock have been pressed together to cause the adhesive to act.

Figure 4 is a broken perspective showing the next step in which the plural folds of the stock are diverged, ready for cutting, paraffining and dipping.

Figure 5 is a view similar to Figure 4, but shows the folds cut into splints to complete a series of match cards.

Figure 6 is a view similar to Figure 5 but showing the paraffined splints with heads attached.

Figure 7 is an edge view of the parts in the position of Figure 6, illustrating how the heads are held separate in dipping.

Figure 8 is a detail view showing the application of adhesive to secure the short end or tab in the cover.

Figure 9 is a detail showing the opposed cover parts on opposite sides of the match cards and with the splints of the cards in close connection as in actual use.

Figure 10 is an edge view showing another step in the operation, with the main cover parts folded over the match cards.

Figure 11 is an edge view of the completed match book.

Figure 12 is a perspective view of a series of match books completed except for separating.

Figure 13 is a perspective view of a match book showing the side which is to be opened.

Figure 14 is a view similar to Figure 13 showing the opposite side with the striking surface on the back of the book instead of the front, as usual.

Fig. 15 is an edge view of an open match book;

Fig. 16 is a side elevation of the closed match book.

Figure 17 is a broken perspective view of the partly folded stock with inserts between the folds.

Figure 18 shows the parts folded together with the inserts in place.

Figure 19 is a perspective of an opened book constructed in accordance with the disclosure in Figures 17 and 18.

Figure 20 is a perspective of the complete book with the filler for the splints and cards.

The match books can be made to best advantage in a series of books which are first formed and then separated.

The stock 10 is usually coated news board or sheet paper of some kind, suitably impregnated against afterglow, preferably of the kind and thickness generally used as covers for match books and it can be conveniently taken from a roll, as shown in Figure 1, although it can be in strips of the desired width, or long strips which are subsequently treated. As stated, in the event a wood splint is inserted, then the paper stock is thinner and need not be news board. Generally speaking, the stock is taken from the roll and is cut off at the line 11, so that in one direction the width will be that of a whole series of match books and in the other direction will be of a width so that when folded and handled as presently described, a series of match books can be formed. And in this connection, I wish to state that while a single book can be made in the manner which I shall describe, it is desirable, for the reasons stated, to make a plurality of books as they can be made just as easily and handled better than a single book.

The stock strip after being cut off at 11, or at practically the same time, the sequence being immaterial, is printed with preferred advertising or display matter on the parts 13 and 14, which form parts of the cover and therefore display the advertising or display matter as usual, and at the same time, or approximately the same time, a strip of striking material 12 is placed on the stock so that it will fold to a position to come on the back of the completed match book, as will presently appear. Adhesive is also applied to this stock strip at the parts 15 and 16 which form the sides of folds made transversely of the stock strip, as shown in Figure 2. These parts 15 and 16 form each one side of separate folds and corresponding parts 18 and 19 are folded over and pressed upon the parts 15 and 16, being doubled at the points 20 and 21, which thus form the free edge portions of the folds, and when the parts 18 and 19 are pressed upon the opposed parts 15 and 16 of the folds, the parts 16 and 18 will adhere as will also the parts 15 and 19, and these may be doubled downward along the line 17, as shown in Figure 4, so that the folded parts will diverge and the free edge portions 20 and 21 of the folds will be in position to receive the match heads 24 after splints 23 have been cut from the folds referred to, and have been paraffined.

In the drawings I have shown two of these laminated folds adapted to be cut into splints, but it will be seen that a single fold or two folds, or even a greater number may be made without at least affecting the principle of the invention.

The folds referred to are cut by ordinary or preferred mechanism into splints 23 and the base 23' of one member of the fold merges into the short end or pad 22 of the cover, while the outer member of the opposed fold merges into the flaps 13 or 14 forming the long part of the cover.

The invention comprises the manipulation and the treatment of the stock and not the instrumentalities for cutting, dipping, folding and applying adhesive, as these are all understood in the art.

The splints 23 are therefore cut in the usual way and dipped in the customary, or any preferred manner.

When the heads 24 have dried the bases of the cards and the immediately adjacent cover parts are secured together by staplings 25, or otherwise, but if staples are not used adhesive may be applied, as for example, by a glue roll 26 to the splint base immediately behind the short tab 22 of the cover so that when this is pressed down it will adhere firmly to the adjacent match card.

The lines 27 in Figures 1 to 6 and in Figure 12 indicate the points or places at which the various match books will be separated, and this can be done with two cutting operations, one of which is prior to folding so that only the selvage strip remains intact, thus permitting the strip to be fed into cutting discs at selvage side, after folding and eliminating danger of fire caused by friction of cutting discs against heads. Folding machinery is used to fold over the parts 13 and 14 so as to cover the splints and permit the end of the flap 13 to extend beneath the edge of the short tab of the cover part 22.

In some cases it is desirable to have an insert or filler in the folds of the stock and this filler may be in the form of a strip 28, shown clearly in Figures 17 and 18. The filler can be of wood which is sometimes desirable, or of other material, and if desired such material may be impregnated with ammonium phosphate or other substance tending to prevent coaling. The strip 28 is a little narrower than the other parts of the fold so that the meeting opposed parts of the fold will overlap the filler and thus, when the fold is cut into splints the cuts will be entirely across the filler so that the formed splints, while containing the desirable filler will be united behind the filler, that is, between the filler and the base of the card, so that it will not be necessary to tear off the filler but a match can be torn off by simply tearing off the stock behind the filler.

From the foregoing description it will be seen that by the use of machines well known in the art, a comparatively wide strip of stock can be handled so as to form a series of match books in which the match cards are of the type stated and are integral with the cover. It is also very simple to introduce a desired filler to better the character of the individual splints, or to reduce the cost of the covering material.

It will be further noted that when the partly folded stock is in the shape shown in Figures 4 and 5 it is very convenient to handle in a cutting machine and also in a dipping machine, and it will be seen that the folds can be easily made along the lines indicated, and at these lines the stock can be scored or otherwise weakened, if desired.

I wish again to call attention to the fact of the importance of making the match cards according to the method described and that the making of the cover parts will necessarily follow the making of the cards and the folding of the cover parts can be varied without affecting the invention generally.

The separation along the lines 27 into individual match books can best be done after the other operations have been completed.

What I claim is:

1. The method of making match books which comprises utilizing a sheet of stock of a width one way corresponding to the width of a plurality of match cards and in the other direction of a width to permit the folding and shaping of folded parts and of cover extensions, then making a plurality of transverse folds in the stock, uniting the opposed parts of each fold, cutting the thus folded parts into match splints, forming the unfolded parts into match covers, and finally cutting the thus formed material into individual match books.

2. The method of making match books which comprises utilizing a sheet of stock of a width corresponding to that of a plurality of match books, printing the stock while flat, producing the transverse folds in the stock, fastening the meeting portions of the folded parts together, then cutting the folded parts into match splints, next forming the unfolded parts into covers, folding said cover parts and then cutting the thus formed material into individual match books.

3. The method of making match books which comprises utilizing a sheet of stock of a width in one direction corresponding to that of a plurality of match books and in the other direction of a length when folded to form a plurality of match books and covers therefor, forming transverse folds in the stock, securing the meeting parts of the folds together, cutting said folded parts into match splints, forming the unfolded parts into covers and folding the same over the match splints and then cutting the thus formed material into individual match books.

4. The method of making match books which comprises utilizing a sheet of stock of a width in one direction corresponding to that of a plurality of match books and in the other direction of a width sufficient to permit the folding of the stock and the production of cover parts, applying a striking surface to the stock while flat, then producing transverse folds in the stock, securing the meeting faces of the folded parts together, cutting said folded portions into match splints, then forming the unfolded parts into match covers, and finally cutting off the thus formed material into individual match books.

In testimony whereof, I have signed my name to this specification this 25th day of January 1929.

CORTLANDT J. LANGLEY.